(12) United States Patent
Brunner et al.

(10) Patent No.: US 6,185,414 B1
(45) Date of Patent: Feb. 6, 2001

(54) WIRELESS TELECOMMUNICATION SYSTEM WITH PREPAID ARCHITECTURE

(75) Inventors: Richard Brunner, Montreal; Sylvain Labonte, St-Bruno de Montarville, both of (CA)

(73) Assignee: Telefonaktiebolaget LM Ericsson (publ) (SE)

( * ) Notice: Under 35 U.S.C. 154(b), the term of this patent shall be extended for 0 days.

(21) Appl. No.: 09/122,344

(22) Filed: Jul. 24, 1998

(51) Int. Cl.$^7$ .................................................. H04M 15/00
(52) U.S. Cl. ............................................. 455/406; 455/414
(58) Field of Search .................................. 455/405–408, 455/422, 432, 416, 417, 414; 379/111, 114, 121

(56) References Cited

U.S. PATENT DOCUMENTS

| | | | |
|---|---|---|---|
| 5,303,297 | * 4/1994 | Hills | 379/114 |
| 5,854,975 | * 12/1998 | Fougnies et al. | 455/408 |
| 5,898,915 | 4/1999 | Reininghaus et al. | 455/406 |
| 6,029,062 | * 12/1998 | Hanson | 455/408 |

FOREIGN PATENT DOCUMENTS

| | | |
|---|---|---|
| 44 19 651 A 1 | 12/1995 | (DE) . |
| 0 746 135 A2 | 12/1996 | (EP) . |
| WO 96/31072 | 10/1996 | (WO) . |
| WO 97/23102 | 6/1997 | (WO) . |

OTHER PUBLICATIONS

EPO—International Search Report PCT/SE 99/01296, dated Nov. 23, 1999.

* cited by examiner

*Primary Examiner*—Nguyen Vo
(74) *Attorney, Agent, or Firm*—Jenkens & Gilchrist

(57) ABSTRACT

There is disclosed a prepaid system and method for permitting a prepaid subscriber of the cellular wireless telecommunication system to revise call features during a call within the operators node and from roaming locations to debit the subscribers prepaid account on a real-time basis. The system includes a switching node permitting a call to be set up with the prepaid subscriber when a prepaid service credit balance exists and terminating the call when the prepaid service credit balance is nil. The switching node continually generates real-time call event Date Message Handler (DMH) formatted messages related to the call made by the prepaid subscriber and forwards these call event messages to a prepaid administrative network. The prepaid administrative network stores the prepaid service credit balance of the prepaid subscriber and generates at call set up an initial charge debiting rate used during the call to reduce the prepaid service credit balance. The prepaid administrative network, in response to the real-time call event messages received from the detailed call event generation means, revises the initial charge debiting rate to generate a real-time debiting rate used during the call to reduce the prepaid service credit balance.

26 Claims, 4 Drawing Sheets

WIRELESS TELECOMMUNICATION SYSTEM WITH PREPAID ARCHITECTURE

FIELD OF THE INVENTION

The present invention relates to a prepaid billing architecture for a wireless telecommunication system that allows a user to access all available prepaid services during a call in progress.

BACKGROUND OF THE INVENTION

Cellular or wireless telecommunication systems have recently introduced a prepayment architecture that allows a subscriber to prepay for services. The advantage with prepaid services for the operator is that the operator obtains payment in advance saving costly collection services or having to obtain security such as credit card information from a subscriber. For the subscriber, the advantage is the subscriber pays as he uses the system avoiding basic monthly service charges when usage is low.

The current prepaid architecture in use and contemplated for cellular wireless telecommunication system stores the pre-payment made by a subscriber in a prepaid application server as a time duration value. When a prepaid subscriber initiates a call, the switching node of the wireless telecommunication system obtains the credit balance of the subscriber from the stored credit balance as a time interval value. The switching node determines the service charging rate for the call depending on the service the subscriber is requesting and applies this charging rate as a timer decrement. That is the timer set at the credit balance is decreased at a rate corresponding to the service requested. When the timer reaches zero time, representing a nil credit balance, then the call is cleared or ended by the switching node.

While the use of the prepaid service is gaining in popularity amongst subscribers and operators, there are two distinct and separate problems encountered by subscribers and operators of the prepaid system. The first to problem experienced by the subscriber is that there is no provision made by the telecommunication system that allows the subscriber to change or add new features during the call. For example, should a subscriber 1) wish to make a conference call, 2) change cell locations moving into a long-distance cell and/or 3) send a data, fax or short service message, the operator is not able to accommodate this change in service during a call because the operator has no mechanism in the prepaid architecture for revising the charging rate for the change in call services on a real-time basis. Consequently, the operator refuses to allow the subscriber access to services that cannot be billed for during the call.

The second problem with the prepaid billing systems is that no mechanism exists allowing the prepaid subscriber to roam between operators having roaming agreements or between operators having telecommunications equipment provided by different equipment suppliers using different proprietary billing protocols. Cellular wireless telecommunication networks currently employ multi-system mobile switching nodes center (MSC) networks that operate with different proprietary billing protocols. Consequently, it is difficult for operators to correlate billing information amongst these MSC networks. It is not possible at this time to correlate this information on a real time basis. Due to the differences in proprietary billing protocols between MSC networks, calls that are setup through several multi-system MSC's are rated according to the information logged in either the gateway MSC through which the call is setup to the public switching telephone network (PSTN) or the anchor MSC through which the call is delivered to the mobile station or prepaid subscriber.

Accordingly, there is a need for a prepaid service architecture that permits a prepaid subscriber to add or change service features during a call and allow the operator to charge for these revised service features. There is also a need to provide a standardized or common billing protocol amongst different operators and different equipment suppliers that permits for prepaid subscribers to access prepaid services while roaming.

SUMMARY OF THE INVENTION

The present invention overcomes the inability of the current prepaid telecommunication systems to allow a subscriber to add or change call features during a call by continually updating or revising the charging rate associated with the call on a real-time basis as call events in the call change.

In accordance with this aspect of the present invention there is provided a wireless telecommunication system having a prepaid service architecture for servicing a prepaid subscriber having a prepaid service credit balance. The system includes a switching node connected to a plurality of base stations in radio frequency communication with said prepaid subscriber. The switching node includes call control means for permitting a call to be set up with the prepaid subscriber when the prepaid service credit balance exists and terminating said call when the prepaid service credit balance is nil. The switching node further includes detailed call event generation means for continually generating real-time call event messages related to the call made by the prepaid subscriber and forwarding the real-time call event messages to a prepaid administrative network. The prepaid administrative network includes prepaid information storage means for storing the prepaid service credit balance of the prepaid subscriber. The prepaid administrative network further includes rate determining means for generating at call set up an initial charge debiting rate used during the call to reduce the prepaid service credit balance. The rate determining means, in response to the real-time call event messages received from the detailed call event generation means, revises the initial charge debiting rate to generate a real-time debiting rate used during the call to reduce the prepaid service credit balance.

The wireless telecommunication system may further include a home locating register connected to the switching node for identifying the prepaid subscriber to the switching node and connected to the prepaid administrative network for instructing the prepaid administrative network to communicate credit balance related information to the switching node. This related information may relate to call set up timing credit balance information for the prepaid subscriber.

The prepaid service credit balance is preferably represented by a time interval, and the initial and real-time debiting rates are preferably represented by time decrements. The rate can be changed by frequency, amount or both.

The prepaid administrative network preferably includes timing means communicating with the prepaid information storage means and the rate determining means to decrement the prepaid service credit balance by an appropriate debiting rate provided by the rate determining means. The timing means forwards a control message to the call control means when the prepaid service credit balance becomes nil. Alternatively, the timing means may be located in the switching node.

The rate determining means preferably stores a plurality of pre-defined debiting rates associated with real time call event features provided by the switching node to the prepaid subscriber. The rate determining means selects one predetermined debiting rate associated with the real time call event feature utilized by the prepaid subscriber and communicated to the rate determining means in the real-time call event message to generate the real-time debiting rate.

The prepaid administrative network preferably includes an interactive voice response system communicating with the switching node and the prepaid information storage means for adding credit to the prepaid service credit balance.

The present invention make further provisions for permitting a subscriber to roam between operators and make calls in telecommunication systems operating under different proprietary protocols. This is achieved by having each of the telecommunication systems generate real time call event messages using Data Message Handler (DMH) formatted messages. Currently, the Telecommunications Industry Association (TIA) standard known as IS-41, herein incorporated by reference, makes provisions for billing information to be sent in the forward direction from a serving or gateway MSC (G-MSC) serving a call request to a destination or visiting MSC (V-MSC) delivering the call to the mobile subscriber. The Telecommunications Industry Association (TIA) is currently developing standard IS-124 known as the DMH standard. By using the standardized IS-124 DMH communication protocol it should be possible to share call event information amongst multi-system MSC networks and perform prepaid accounting operations. Hence, the DMH standard accommodates different types of call events presently existing and will be modified to account for future types of call events not yet conceived. Consequently, use of DMH standard formatted message in one aspect of the present invention eliminates the need for prepaid architectures to modify proprietary protocol accounting messages presently used in the prepaid systems.

In accordance with another aspect of the present invention there is provided a method for servicing a prepaid subscriber having a prepaid service credit balance in a wireless telecommunication system having a switching node connected to a plurality of base stations in radio frequency communication with said prepaid subscriber and a prepaid administrative network connected with the switching node. The method includes the steps of:

the switching node permitting a call to be set up with the prepaid subscriber when the prepaid service credit balance exists and terminating the call when the prepaid service credit balance is nil, the switching node generating real-time call event messages related to the call made by the prepaid subscriber and forwarding the real-time call event messages to the prepaid administrative network; and, the prepaid administrative network storing the prepaid service credit balance of the prepaid subscriber; and, the prepaid administrative network generating at call set up an initial charge debiting rate used during the call to reduce the prepaid service credit balance, and in response to the real-time call event messages received from the detailed call event generation means revising the initial charge debiting rate to generate a real-time debiting rate used during the call to reduce the prepaid service credit balance.

In accordance with still yet anther aspect of the present invention, the present invention introduces a new signaling message from the prepaid administrative network to the switching node. This message is a timer management order message that includes revised timer parameter information to reset the timer in the switching node. This resetting may be to add credit balances or change the rate of decrementing the timer.

BRIEF DESCRIPTION OF THE DRAWINGS

For a better understanding of the nature and objects of the present invention reference may be had to the accompanying diagrammatic drawings in which.

DETAILED DESCRIPTION OF THE DRAWINGS

Figure 1:
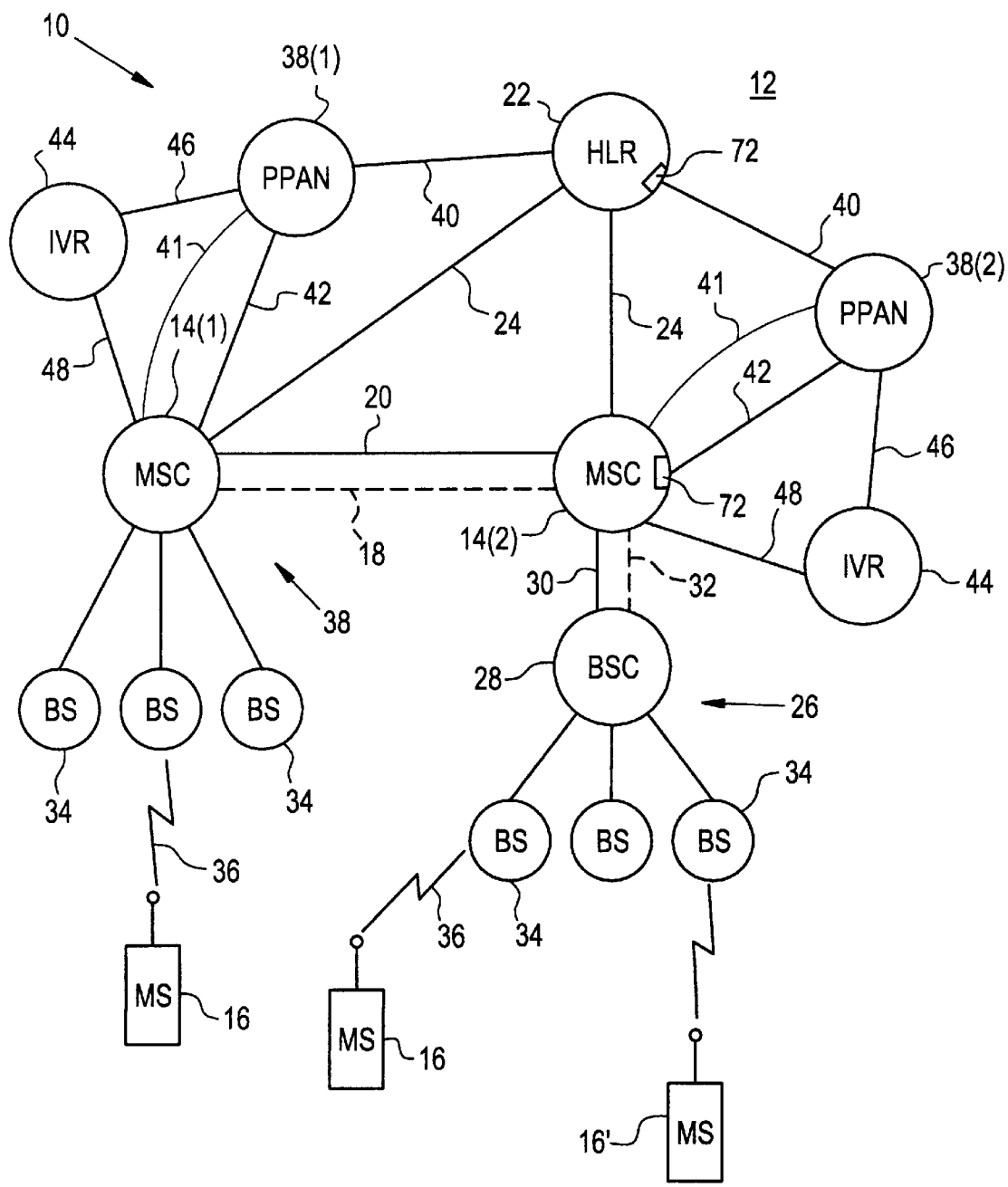
FIG. 1 is a schematic diagram of a wireless communications system including a prepaid administrative network in a cellular telephone system.

Reference is now made to FIG. 1 wherein there is shown a schematic diagram of a wireless communications system 10 including a public access cellular telephone system 12. The public access cellular telephone system 12 includes a plurality of interconnected switching nodes 14 commonly referred to as mobile switching centers (MSC). Although only two mobile switching centers 14 are shown, it will be understood that the system 12 likely includes many more interconnected nodes. The first and second mobile switching centers 14(1) and 14(2) may comprise any one of a number of known telecommunications switching devices, including those commonly used and known in the art for providing either digital or analog cellular telephone service to a plurality of mobile stations (MS) 16. The mobile switching centers 14 are interconnected with each other for communication via both voice trunks 18 (illustrated with broken lines) and signaling links 20 (illustrated with solid lines) together providing a known ISUP (or R1 or R2) type connection. The voice trunks 18 provide voice and data communications paths used to carry subscriber communications between the mobile switching centers 14. The signaling links 20 carry command signals (such as IS-41 or other signaling system no. 7 SS7 messages) between the mobile switching centers 14. These signals may be used, for example, in setting up and tearing down voice and data communications links over the voice trunks 18 and controlling the provision of calling services to the mobile stations 16. The mobile switching centers 14 are also connected to a data base 22 comprising a home location register (HLR) by means of signaling links 24 providing a known IS-41 (or other SS7) type connection. The data base 22 stores information concerning the mobile stations 16 comprising location information and service information.

In one cellular system implementation, illustrated generally at 26, the mobile switching center 14 is further connected to at least one associated base station controller (BSC) 28 via both a signaling link 30 and a voice trunk 32. Only one base station controller 28 is shown connected to mobile switching center 14(2) in order to simplify the illustration. The voice trunk 32 provides a voice and data communications path used to carry subscriber communications between the second mobile switching center 14(2) and its base station controller 28. The signaling link 30 carries command signals (such as SS7 messages) between the node 14 and its associated base station controller 28. The signaling link 30 and trunk 32 are collectively commonly referred to in the art as the "A interface". The base station controller 28 is then connected to a plurality of base stations (BS) 34 which operate to effectuate radio frequency communications with proximately located mobile stations 16 over an air interface 36. The base station controller 28 functions in a well known manner to control this radio frequency communications operation.

In another cellular system implementation, illustrate generally at 38, the mobile switching center 14(1) is further connected to a plurality of base stations (BS) 34 which operate to effectuate radio frequency communications with proximately located mobile stations 16 over the air interface 36. In this implementation, the functionality provided by the base station controller 28 (see, generally at 26) is instead provided by the mobile switching center 14.

Although direct communications links (signaling and/or trunk) are illustrated for the system 12 of FIG. 1, it is understood by those skilled in the art that the links are not necessarily direct between the illustrated nodes, and may instead pass through many other communications nodes (not shown) of the mobile network, and perhaps even utilize other communications networks (such as the public switched telephone network—PSTN). Illustration of the links in the manner shown in FIG. 1 is therefore by way of simplification of the drawing.

The wireless communications system 10 further includes prepaid administrative networks (PPAN) 38(1) and 38(2) that provide administration of a prepaid subscriber for mobile station 16. The prepaid administrative network 38 stores a listing of prepaid subscribers and the associate prepaid service credit balance for each prepaid subscriber 16. The prepaid administrative network 38 communicates this credit balance information across signaling links 41 to the MSC 14 in response to receipt of a message from home located register 22 across link 40. The request for credit balance information comes from the HLR 22 in response to the MSC 14 notifying the HLR 22 over communication link 24 of the prepaid subscriber. The HLR 22 verifies the prepaid subscriber in the telecommunications system. Communication signaling links 40 and 41 carry command signals (such as IS-41 or other signaling system no. 7 SS7 messages) between the mobile switching centers 14.

The prepaid administrative network 38 includes an Internet Protocol (IP) communication or signaling link 42 connected to the mobile switching center 14. The signaling links 42 carry real-time call event messages across the IP links using Transmission Control Protocol (TCP). In the present invention, these real time call event messages are formatted in accordance with Data Message Handling (DMH) formatted protocol messages of the IS-124 standard. This call event messaging is utilized by the prepaid administrative network to revise the credit rating charge on a call made by the prepaid subscriber.

The wireless telecommunication system further includes an interactive voice responsive unit (IVR) 44 connected over communications links 46 to the prepaid administrative network 38. The communication links 46 carry updating credit information to the prepaid administrative network 38. The voice responsive unit 44 is also connected to the mobile switching center 14 over voice trunks 48. In operation, the voice responsive unit 44 permits a prepaid subscriber to place a call into the mobile switching center 14 and add credit to the subscriber's prepaid account over the communications link 46.

Figure 2:
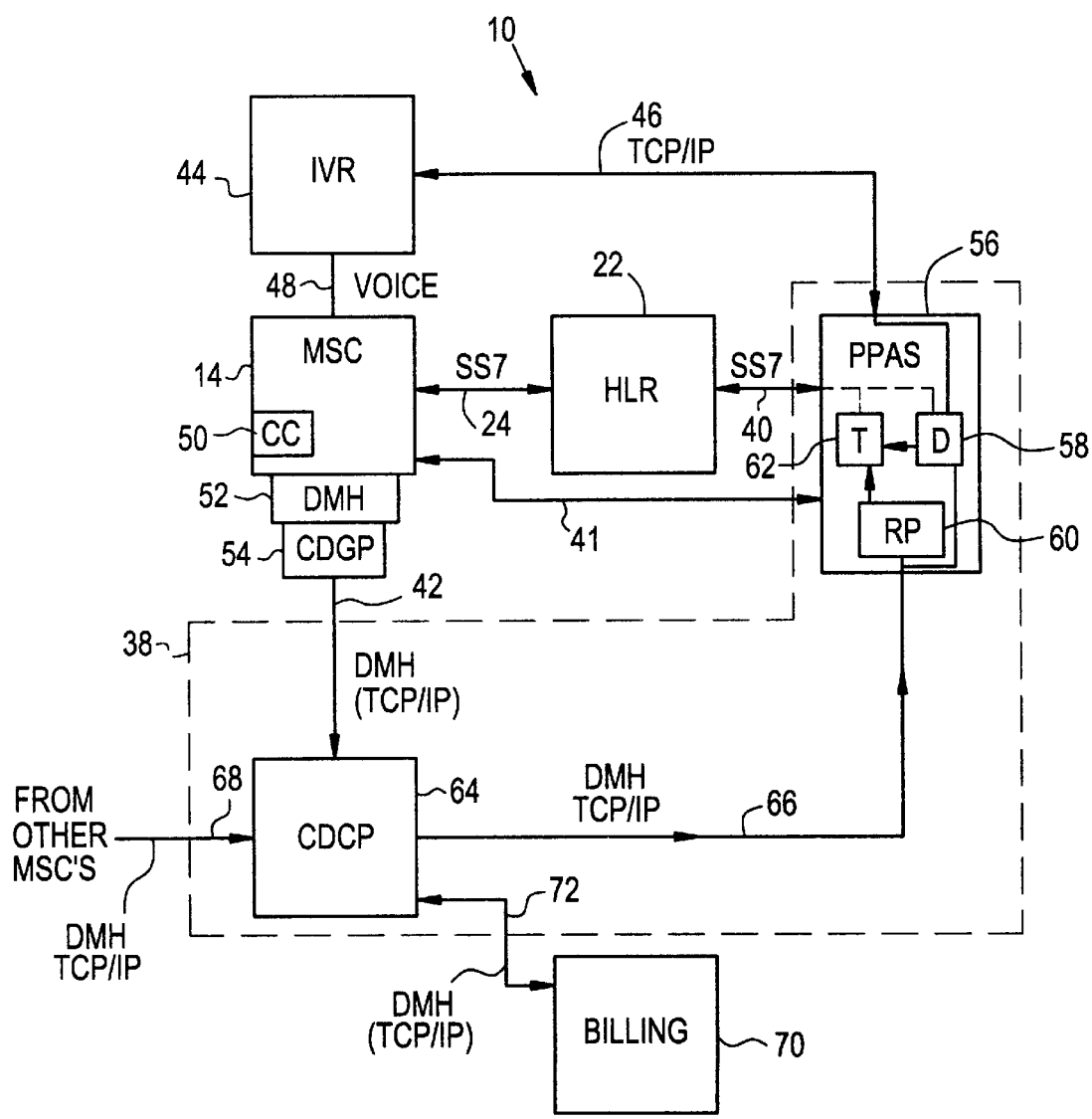
FIG. 2 illustrates a further schematic drawing showing a preferred embodiment for the prepaid administrative network in greater detail.

For a better understanding of the operation of the prepaid administrative network 38 within the wireless communications system 10, reference is now made to FIG. 2 wherein like communication links and network points identified FIG. 1 have been identified in FIG. 2 using like numbers and acronyms. In FIG. 2, the prepaid administrative network 38 is shown within broken lines.

The mobile switching center 14 includes a call control unit 50 for permitting a call to be set up with the prepaid subscriber when the prepaid service credit balance exists and terminating the call when the prepaid service credit balance is nil. The mobile switching center further includes a DMH protocol conversion unit 52 and a call detailed generation point 54 for continually generating real-time call event DMH formatted messages related to the call made by the prepaid subscriber and forwarding the real-time call event DMH formatted messages to a prepaid administrative network 38 over DMH signaling link 42.

The home location register (HLR) 22 is connected between the mobile switching center 14 and the prepaid administration network 38 for identifying the prepaid subscriber to the mobile switching center 14 and for instructing the network 38 to communicate other messages from the network 38 to the mobile switching center 14 over signaling link 41.

The prepaid administrative network 38 includes a prepaid applications server (PPAS) 56 having a database 58 that stores information related to the prepaid service credit balance of the prepaid subscriber. This database 58 is updated with new credit balance information received from the interactive voice responsive unit 44 to revise the subscriber's credit. The prepaid application server 56 further includes a rate determining table 60 for generating at call set up an initial charge debiting rate used during the call to reduce the prepaid service credit balance. The rate determining means in response to the real-time call event DMH formatted messages received from the call detailed generation point 54, revises the initial charge debiting rate to generate a real-time debiting rate used during the call to reduce the prepaid service credit balance. The rate determining point 60 stores a plurality of pre-defined debiting rates associated with real-time call event features provided by the mobile switching center 14 to the prepaid subscriber, The rate determining point 60 selects one predetermined debiting rate associated with the real time call event feature utilized by the prepaid subscriber and communicates the charging rate to timer 62 located within the prepaid application server 56.

The database 58 forwards subscriber credit balance information in the form of a time interval signal to set the timer 62. The timer 62 receives a timing rate decreasing signal or rate decrement value from the charge rate determining table 60 and begins to decrease the time interval as the prepaid subscriber continues with the call. At the end of the call, the timer 62 forwards a signal to the database 58 associated with the unused time still available as credit to the prepaid subscriber. An initial charge rate is communicated to the timer 62 from the charge rating table 60 that is associated with the services that the prepaid subscriber is using at call set up and communicated from the mobile switching center 14 in DMH formatted messages. In the event the prepaid subscriber changes the services associated with the call such as for example, adding another leg to the call in the form of a conference call, changing cell locations, changing switch locations or roaming into another service area, then the updated call event information is forwarded to the call charge rating point 60 and a new rate is sent to the timer 62 to decrement the timing credit balance remaining in the call. When the credit balance in the call reaches a nil value, then the timer 62 forwards a message to the switching center 14 over communication links 24 and 40, through the home locating register 22 to clear down or terminate the call. The call is then terminated by the call control unit 50 in the mobile switching center 14. It is within the realm of the present invention for the timer 62 to send messages to the call control unit 50 when predetermined balances are reached so that the mobile switching center 14 can alert the subscriber to the diminished credit balance. With this information, the prepaid subscriber can manage the call to terminate it at a convenient time or elect to increase the credit balance in the database 58. When the credit balance in database 58 is increased during a call, then the signal is sent to the timer 62 to reset or increment the time interval credit balance in accordance with the credit added to the prepaid subscriber's account.

The prepaid administrative network 38 further includes a call detail collection point (CDCP) 64 connected with the call detail event generation point 54 of the mobile switching center 14 and the rate determining table 60. The signaling between call detail collection point and the call event rating table is over Internet Protocol (IP) communication links 66. The call detail collection point is further connected to other mobile switching centers via communication links 68 (DMH) outside the present mobile switching center 14 for relaying real-time call event DMH formatted messages from the other nodes when the prepaid subscriber is receiving service from the other nodes outside of the subscriber's home service area. This call detail collection point 64 makes it possible for the prepaid subscriber to roam outside his service area serviced by the mobile switching center 14 and still continue to have service. In this instance, when the time credit balance in timer 62 reaches a nil value, then the message sent to the call control point 50 in the switch serving the call and the call is cleared down or terminated by the visiting switch.

The last point shown in FIG. 2 is the billing or accounting administration center 70. This center is connected to the call detail collection point 64 via communications link 72 to receive DMH formatted messages for billing purposes. This information is not real-time accounting as in the prepaid application server and handles subscribers who are not prepaid subscribers of the wireless telecommunication system 10.

Figure 3:
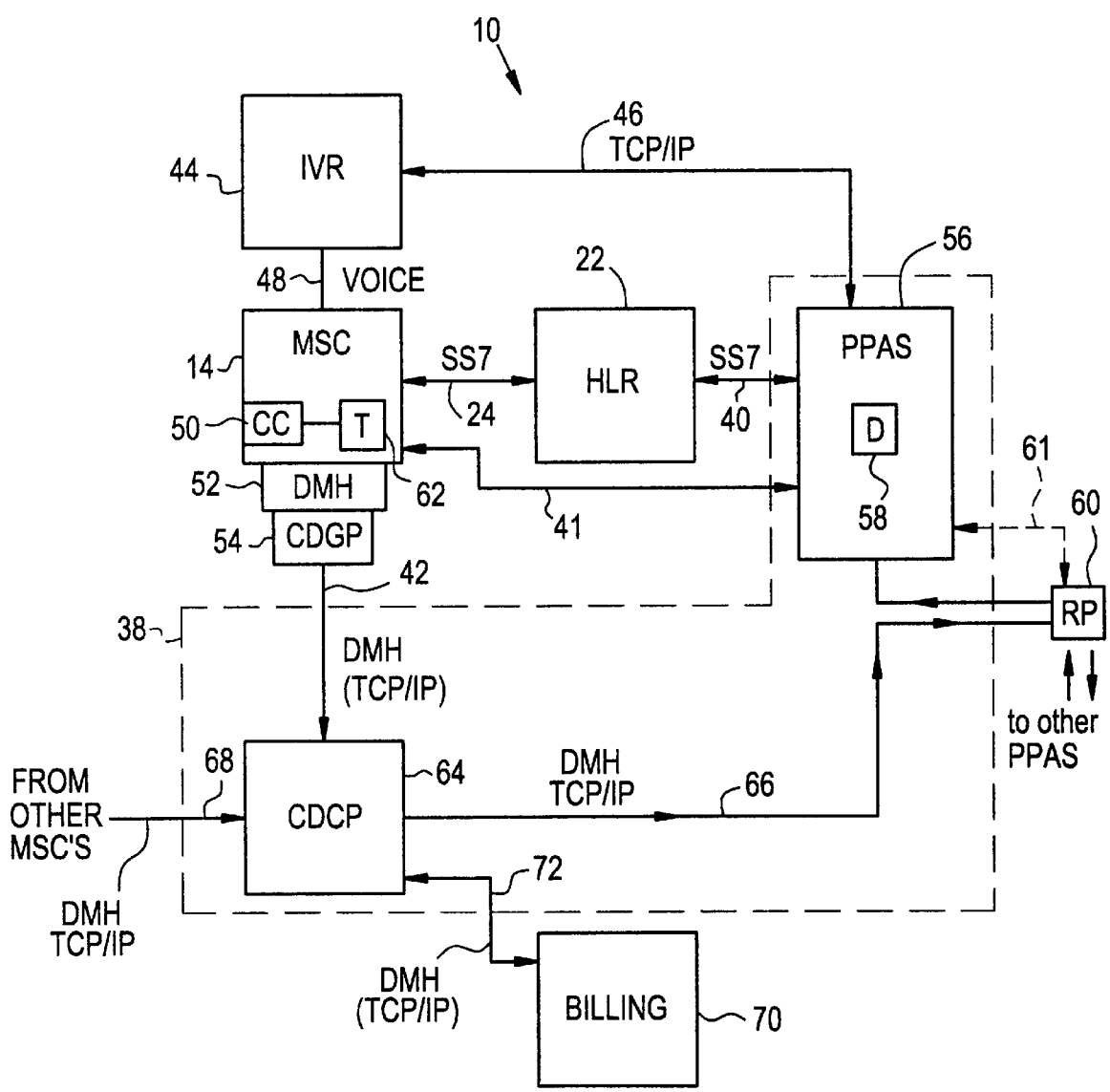
FIG. 3 illustrates a further schematic drawing similar to FIG. 2 showing an alternative embodiment; and, FIG. 4 is a signal flow and node operation diagrams illustrating real-time DMH formatted message flowing between the serving mobile switching center and the prepaid administrative network.

Referring to FIG. 3, an alternative network layout is shown for the prepaid administrative network 38 and the mobile switching center 14. In this embodiment there are two changes from the embodiment of FIG. 2. First, the timer 62 is now located in the mobile switching center 14. Secondly, the call detail rating table 60 is now located as a node that services the prepaid applications server 56. In this embodiment, the call detail rating table 60 is able to service more than one prepaid application server common to one operator. An alternative signaling link connection for the call detail rating table is shown by broker line 61. In this alternative, the link 66 would be connected directly from the call detail collection point 64 to the prepaid application server 56.

Figure 4:
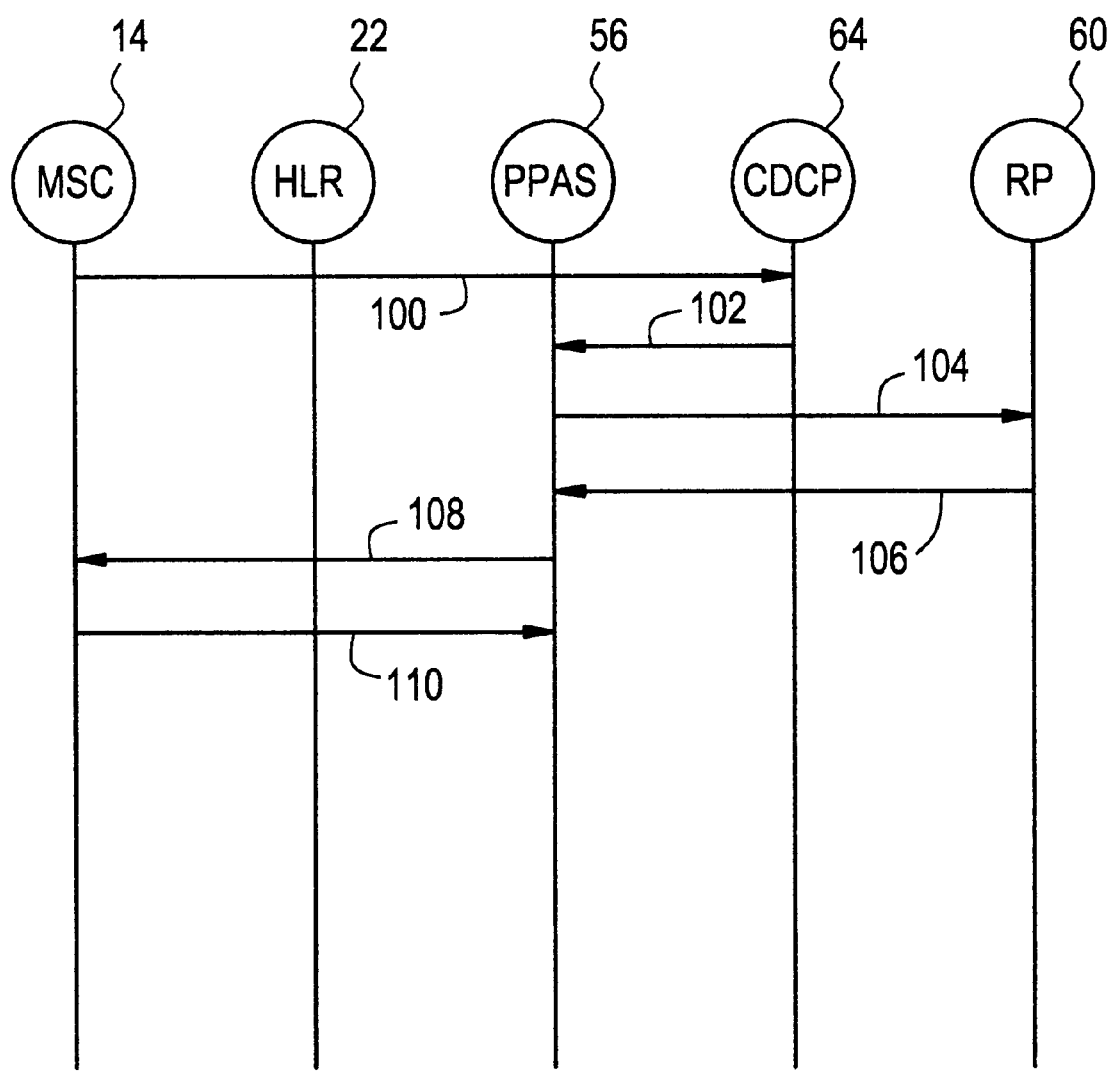

Referring to FIGS. 4 there is shown signal flow and node operation diagram illustrating real-time DMH formatted message flow between the serving mobile switching center 14, including timer 62, and the prepaid administrative network 38 over the signaling links shown in FIGS. 3. In FIG. 4, the serving or gateway MSC 14 forwards a DMH formatted message 100 to the call detail collection point 64 of the prepaid administrative network 38. Message 100 represents a call event occurring in real time during a call placed by a prepaid subscriber. This message 100 further includes information relating to the identity of the prepaid subscriber. The call detail collection point 64 next sends a DMH formatted IP protocol message 102 to the prepaid application server 56 representing the call event. The prepaid application server 56 sends a rate request message 104 to the rating point table 60 which in turn returns a rating value message 106 associated with the call event to the prepaid application server 56. In the embodiment shown in FIG. 2, the rating point 60 can be located within the prepaid application server 56. Next the prepaid application server 56 creates a timer management order message 108 and sends this message 108 to the MSC 14 to control the timer operation in MSC 14. When the call is complete, the MSC 14 sends a return message 110 to the prepaid application server 56 which message 110 is a timing value corresponding to unused time credit balance remaining of the prepaid subscriber. This message is stored in the storage means of the prepaid application server 56.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A wireless telecommunication system having a prepaid service architecture for servicing a prepaid subscriber having a prepaid service credit balance, including:
 (a) a switching node connected to a plurality of base stations in radio frequency communication with said prepaid subscriber, said switching node including:
  (i) call control means for permitting a call to be set up with the prepaid subscriber when the prepaid service credit balance exists and to terminating said call when the prepaid service credit balance is nil, and
  (ii) detailed call event generation means for continually generating real-time call event messages related to call features selected by the prepaid subscriber during the call and forwarding the real-time call event messages to a prepaid administrative network; and,
 (b) the prepaid administrative network connected with the switching node including:
  (i) prepaid information storage means for storing the prepaid service credit balance of the prepaid subscriber, and,
  (ii) rate determining means for generating at call set up an initial charge debiting rate used during the call to reduce the prepaid service credit balance, and the rate determining means in response to the real-time call event messages received from the detailed call event generation means revising the initial charge debiting rate to generate a real-time debiting rate associated with the selected call feature used during the call to reduce the prepaid service credit balance.

2. The wireless telecommunication system of claim 1 further including a home locating register connected to the switching node for identifying the prepaid subscriber to the switching node and connected to the prepaid administrative network for directing the prepaid administrative network to communicate credit balance related information to the switching node.

3. The wireless telecommunication system of claim 1 wherein the prepaid service credit balance is represented by a time interval, and the initial and real-time debiting rates are represented by time decrements.

4. The wireless telecommunication system of claim 3 wherein the prepaid administrative network further includes timing means communicating with the prepaid information storage means and the rate determining means to decrement the prepaid service credit balance by an appropriate debiting rate provided by the rate determining means, said timing means forwarding a control message to the call control means when the prepaid service credit balance becomes nil.

5. The wireless telecommunication system of claim 3 wherein the switching node further includes timing means communicating with the prepaid information storage means and the rate determining means to decrement the prepaid service credit balance by an appropriate debiting rate provided by the rate determining means, said timing means forwarding a control message to the call control means when the prepaid service credit balance becomes nil.

6. The wireless telecommunication system of claim 1 wherein the rate determining means stores a plurality of pre-defined debiting rates associated with subscriber selected call features provided by the switching node to the call, said rate determining means selecting one predetermined debiting rate associated with the call feature selected by the prepaid subscriber for the call and communicated to the rate determining means in the real-time call event message to generate the real-time debiting rate.

7. The wireless telecommunication system of claim 1 wherein the prepaid administrative network includes an interactive voice response system communicating with the switching node and the prepaid information storage means for adding credit to the prepaid service credit balance.

8. A wireless telecommunication system having a prepaid service architecture responsive to Data Message Handler (DMH) formatted messages for servicing a prepaid subscriber having a prepaid service credit balance, including:
 (a) a switching node connected to a plurality of base stations in radio frequency communication with said prepaid subscriber, said switching node including:
  (i) call control means for permitting a call to be set up with the prepaid subscriber when the prepaid service credit balance exists and to terminating said call when the prepaid service credit balance is nil, and
  (ii) detailed call event generation means for continually generating real-time call event DMH formatted messages related to call features selected by the prepaid subscriber during the call and forwarding the real-time call event DMH formatted messages to a prepaid administrative network;
 (b) the prepaid administrative network connected with the switching node and the home location register including:
  (i) prepaid information storage means for storing the prepaid service credit balance of the prepaid subscriber, and,
  (ii) rate determining means for generating at call set up an initial charge debiting rate used during the call to reduce the prepaid service credit balance, and the rate determining means in response to the real-time call event DMH formatted messages received from the detailed call event generation means revising the initial charge debiting rate to generate a real-time debiting rate associated with the selected call feature used during the call to reduce the prepaid service credit balance.

9. The wireless telecommunication system of claim 8 further including a home locating register connected to the switching node for identifying the prepaid subscriber to the switching node and connected to the prepaid administrative network for directing the prepaid administrative network to communicate credit balance related information to the switching node.

10. The wireless telecommunication system of claim 8 wherein the prepaid service credit balance is represented by a time interval, and the initial and real-time debiting rates are represented by time decrements.

11. The wireless telecommunication system of claim 9 wherein the prepaid administrative network further includes timing means communicating with the prepaid information storage means and the rate determining means to decrement the prepaid service credit balance by an appropriate debiting rate provided by the rate determining means, said timing means forwarding a control message to the call control means when the prepaid service credit balance becomes nil.

12. The wireless telecommunication system of claim 10 wherein the switching node further includes timing means communicating with the prepaid information storage means and the rate determining means to decrement the prepaid service credit balance by an appropriate debiting rate provided by the rate determining means, said timing means forwarding a control message to the call control means when the prepaid service credit balance becomes nil.

13. The wireless telecommunication system of claim 8 wherein the rate determining means stores a plurality of pre-defined debiting rates associated with subscriber selected call features provided by the switching node to the call, said rate determining means selecting one predetermined debiting rate associated with the call feature selected by the prepaid subscriber for the call and communicated to the rate determining means in the real-time call event DMH formatted message to generate the real-time debiting rate.

14. The wireless telecommunication system of claim 8 wherein the prepaid administrative network includes an interactive voice response system communicating with the switching node and the prepaid information storage means for adding credit to the prepaid service credit balance.

15. The wireless telecommunication system of claim 8 wherein the prepaid administrative network further includes a call detail collection means connected with the detailed call event generation means of the switching node and with the rate determining means, the call detail collection means further interconnected with other switching nodes for relaying real-time call event DMH formatted messages from the other nodes, when the prepaid subscriber is receiving service from the other nodes, to the rate determining means.

16. The wireless telecommunication system of claim 8 wherein real-time call event DMH formatted messages are transmitted between the switching node and the prepaid administrative network over Internet Protocol (IP) communication lines.

17. The wireless telecommunication system of claim 15 wherein the IP communications lines are Transmission Control Protocol (TCP) over IP protocol.

18. The wireless telecommunication system of claim 8 wherein the switching node is connected to the home location register and the home location register is connected to the prepaid administrative network, and the switching node is connected to the prepaid administrative network by communications links configured in accordance with Signaling System No. 7 (SS7) protocols.

19. A method for servicing a prepaid subscriber having a prepaid service credit balance in a wireless telecommunication system a switching node connected to a plurality of base stations in radio frequency communication with said prepaid subscriber and a prepaid administrative network connected with the switching node, the method including the steps of:

the switching node permitting a call to be set up with the prepaid subscriber when the prepaid service credit balance exists and terminating said call when the prepaid service credit balance is nil, the switching node generating real-time call event messages related to call features selected by the prepaid subscriber during the call and forwarding the real-time call event messages to the prepaid administrative network; and, the prepaid administrative network storing the prepaid service credit balance of the prepaid subscriber, and, the prepaid administrative network generating at call set up an initial charge debiting rate used during the call to reduce the prepaid service credit balance, and in response to the real-time call event messages received from the detailed call event generation means revising the initial charge debiting rate to generate a real-time debiting rate associated with the selected call feature used during the call to reduce the prepaid service credit balance.

20. The method of claim 19 wherein the wireless telecommunication system further includes a home locating register connected to the switching node and the prepaid administrative network, the home locating register performing the steps of identifying the prepaid subscriber to the switching node and instructing the prepaid administrative network to communicate the prepaid credit balance to the switching node.

21. The method of claim 19 wherein the prepaid service credit balance is represented by a time interval, and the initial and real-time debiting rates are represented by time decrements.

22. The method of claim 19 wherein the prepaid administrative network further performs the steps of decrementing the prepaid service credit balance by an appropriate debiting rate and forwarding a control message to switching node when the prepaid service credit balance becomes nil.

23. The method of claim 19 wherein the switching node further performs the steps of decrementing the prepaid service credit balance by an appropriate debiting rate.

24. The method of claim 19 wherein the real-time call event messages related to the call generated by the switching node are Data Message Handler (DMH) formatted messages.

25. In a wireless telecommunication system having a prepaid service architecture responsive to Data Message Handler (DMH) formatted messages for servicing a prepaid subscriber having a prepaid service credit balance, including:

(a) a switching node connected to a plurality of base stations in radio frequency communication with said prepaid subscriber, said switching node including a timer set for a call in accordance with predetermined timer parameters including a time value corresponding to the service credit balance of the prepaid subscriber and at a rate of decrement to reduce time value at a rate associated with the call, the switching node continually generating real-time call event DMH formatted messages related to call features selected by the prepaid subscriber during the call and forwarding the real-time call event DMH formatted messages to a prepaid administrative network; and, (b) the prepaid administrative network determining debiting rates associated with the real-time call event DMH formatted messages received from the detailed call event generation means and forwarding a timer management order message to the switching node that includes a revised rate of decrement associated with the selected call feature.

26. The wireless telecommunication system of claim 25 wherein the switching node sends a return timing value message to the prepaid administrative network which message is a timing value corresponding to unused time credit balance remaining of the prepaid subscriber, and the return timing value message is stored by the prepaid administrative network.

* * * * *